(12) United States Patent
Feng

(10) Patent No.: US 9,597,816 B2
(45) Date of Patent: Mar. 21, 2017

(54) WOODWORKING TABLE SAW WITH VACUUMING FUNCTION

(71) Applicant: Zhen Feng, Qingdao (CN)

(72) Inventor: Zhen Feng, Qingdao (CN)

(*) Notice: Subject to any disclaimer, the term of this patent is extended or adjusted under 35 U.S.C. 154(b) by 134 days.

(21) Appl. No.: 14/497,138

(22) Filed: Sep. 25, 2014

(65) Prior Publication Data

US 2015/0082958 A1  Mar. 26, 2015

(30) Foreign Application Priority Data

Sep. 25, 2013  (CN) .................... 2013 2 0598817 U

(51) Int. Cl.
*B26D 7/06* (2006.01)
*B27G 19/08* (2006.01)
*B23D 59/00* (2006.01)

(52) U.S. Cl.
CPC ........... *B27G 19/08* (2013.01); *B23D 59/006* (2013.01); *Y10T 83/207* (2015.04)

(58) Field of Classification Search
CPC ...... B27G 19/08; B23D 59/006; Y10T 83/207
USPC ..................................... 30/100; 83/100, 581
See application file for complete search history.

(56) References Cited

U.S. PATENT DOCUMENTS

| | | | | |
|---|---|---|---|---|
| 2,044,481 | A * | 6/1936 | Manley ................ | B23D 59/006 144/252.1 |
| 2,711,061 | A * | 6/1955 | Fegert .................... | B24B 55/06 451/456 |
| 4,367,665 | A * | 1/1983 | Terpstra ............... | B23D 59/006 83/100 |
| 6,948,412 | B2 * | 9/2005 | Brazell ................ | B23D 59/006 144/252.2 |
| 8,844,415 | B2 * | 9/2014 | Taylor ................. | B23D 59/006 83/100 |
| 2002/0096030 | A1 * | 7/2002 | Wang ................... | B23D 45/067 83/477.1 |
| 2007/0044609 | A1 * | 3/2007 | Brazell ................ | B23D 59/006 83/100 |
| 2014/0157965 | A1 * | 6/2014 | Simon ................. | B23D 47/025 83/98 |

* cited by examiner

*Primary Examiner* — Omar Flores Sanchez
(74) *Attorney, Agent, or Firm* — Anthony King; David Yu

(57) ABSTRACT

The present invention relates to a woodworking table saw with a worktable a saw blade, an eccentric motor and a vacuuming air box. The saw blade extends through a slot in the worktable into a closed box, which is hung beneath the worktable. The eccentric motor is coupled to the saw blade and the vacuuming air box via a belt.

6 Claims, 5 Drawing Sheets

A-A

__US 9,597,816 B2__

WOODWORKING TABLE SAW WITH VACUUMING FUNCTION

CROSS REFERENCE OF RELATED APPLICATION

This application claims priority to China Patent Application No. 201320598817.4, filed on Sep. 25, 2013, issued on Apr. 2, 2014, as China Patent No. CN 203510344 U, which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate.

FIELD OF THE INVENTION

The present invention is related to a woodworking table saw with a self vacuuming function.

BACKGROUND OF THE INVENTION

Generally speaking, a woodworking table saw currently available on the market is not provided with a vacuuming function, so that a lot of sawdust and dust powder are produced in the working environment as sawing a wood plank or sawing a high density board using a table saw. Particularly, in a situation of cutting a high density board, dust will spread all over the air and pollute the working and living environment to affect the health of the workers. Some specific table saws utilize a scheme that connects a vacuuming device or a woodworking dust collection device to the table saw, but such mechanism have drawbacks such as a problem of not common use, size too large, low portability and high cost.

SUMMARY OF THE INVENTION

The objective of the present invention is to provide a woodworking table saw with a self vacuuming function that is with a compact structure in a way that only a small space is required and with high portability.

The present invention utilizes following technical scheme to achieve the aforementioned objective:

A woodworking table saw with self vacuuming function, comprising: a worktable and a saw blade, the worktable being provided with a saw slot through which the saw blade is extended, a blade guard being disposed on the saw slot, a riving knife being disposed adjacent to a side of the saw blade, and a riving knife holder being provided for holding the riving knife, wherein the woodworking table saw further has a closed box, an eccentric motor, a vacuuming air box and a dust bag, the closed box is hung beneath the worktable by lugs disposed under two sides of the worktable, the eccentric motor is fixed at a side of the closed box, the eccentric motor is provided with an eccentric shaft which has one end coupling to the saw blade and the other end coupling to a central shaft of the vacuuming air box via a belt, a fan blade is fixed on the central shaft, an air inlet of the vacuuming air box is in communication with a dust outlet of the closed box and an air outlet of the vacuuming air box is in communication with the dust bag.

According to an embodiment of the present invention, an upper portion of the closed box is formed with a curved convex structure, and an lower portion of the saw slot which is connected with the closed box is formed with a curved concave structure corresponding to the curved convex structure. In this way, the closed box and the saw slot can be connected tightly while the closed box is rotated, so that the sealing performance of the closed box is ensured.

According to an embodiment of the present invention, a locking handle is disposed at an outer end of the eccentric motor, which is for fixing the connection between the box and the eccentric motor and the vacuuming air box located on top of the closed box.

According to an embodiment of the present invention, the two sides of the blade guard is attached to the worktable in a way that the saw blade is completely covered by the blade guard. In this way, a pollution caused by the leaked dust can be avoided.

According to an embodiment of the present invention, an opening is formed at a connecting portion between the riving knife holder and the riving knife, a size and a thickness of the opening corresponds to a lower portion of the riving knife, and a positioning device is disposed adjacent to a side of the riving knife holder so as to enable the saw blade to be fixed. In this way, it is more convenient for the user to take/place the riving knife.

According to an embodiment of the present invention, the air inlet of the vacuuming air box is provided with a separating net for preventing an invasion of wood chunk that may damage the fan blades of the vacuuming air box.

According to an embodiment of the present invention, the air outlet of the vacuuming air box is provided with a concave ring groove for connecting the air outlet and the dust bag.

According to an embodiment of the present invention, the woodworking table saw further comprises an extension table provided whose lower portion is with two rods by which the worktable is inserted and is fixed by a bolt. The extension table can be placed at the left or right side of the worktable to increase the working area so that it is more convenient for the user to cut the timber. The extension table can be easily unmounted from the worktable.

According to an embodiment of the present invention. a rotatable adjusting angle between the closed box and the worktable is in a range from 0° to 45° for cutting the timber in a tilting angle.

According to the above, the present invention has following merits:

The woodworking table saw with a self vacuuming function of the present invention is operated in such a way that the vacuuming air box and a saw blade are synchronously operated as turned on and turned off, so as to achieve the goal of collecting the sawdust and dust produced in the work, and the produced sawdust and dust are maintained within a closed environment without the leakage and pollution. The woodworking table saw with a self vacuuming function of the present invention is with a compact structure so it only requires a small space and with high portability as well.

DETAILED DESCRIPTION OF THE PREFERRED EMBODIMENTS

The structure and the technical scheme adopted by the present invention can be best understood by referring to the following detailed description of the preferred embodiments and the accompanied drawings.

Figure 1:
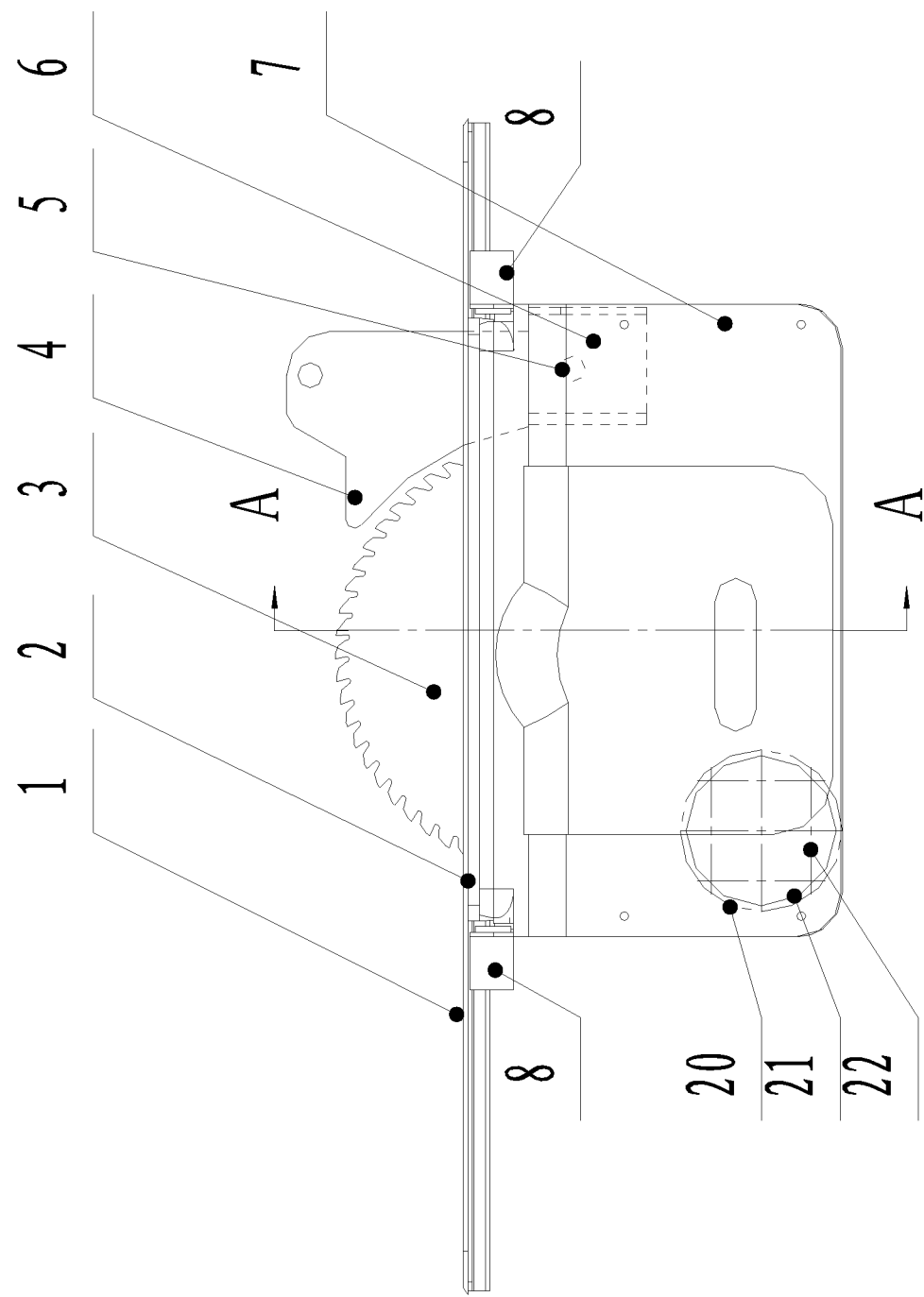
FIG. 1 is a schematic drawing of the woodworking table saw with self vacuuming function in the present invention.
Figure 2:
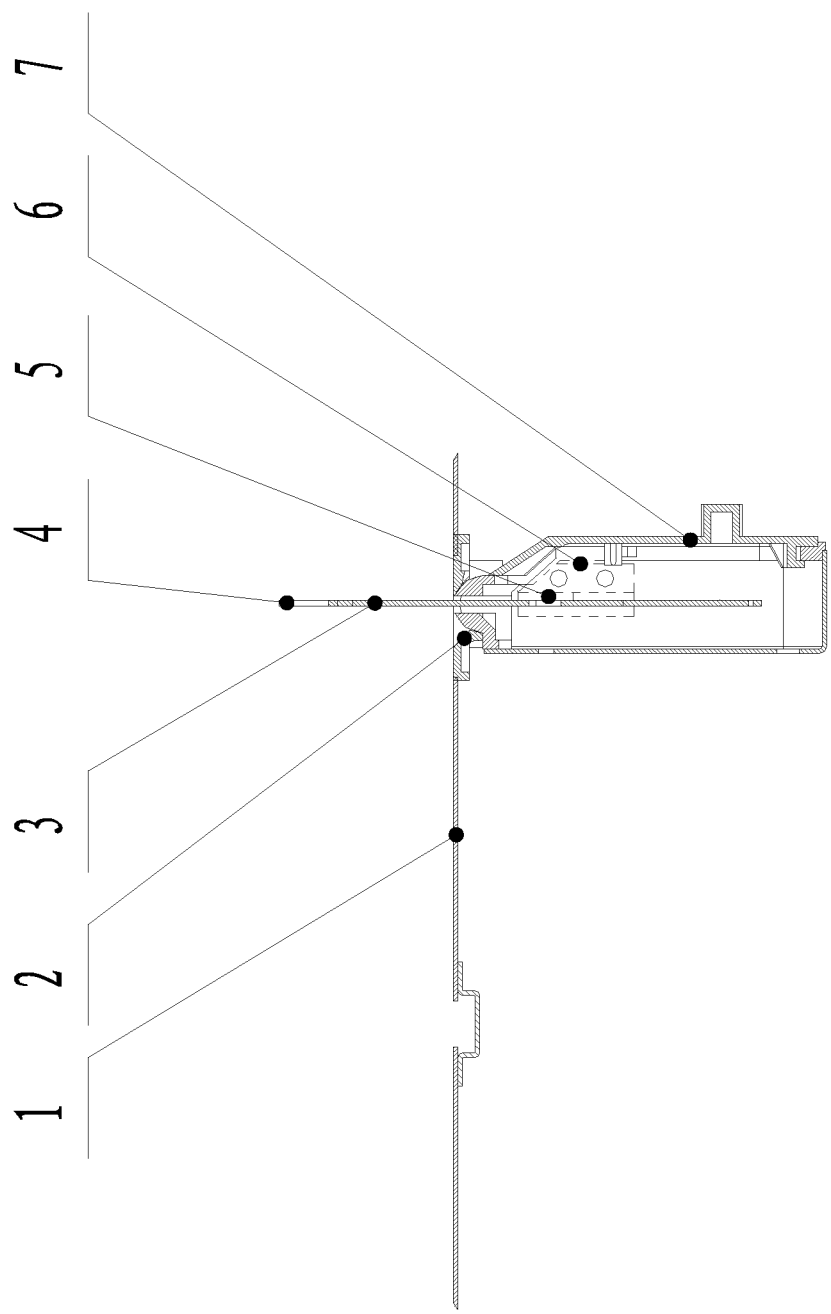
FIG. 2 is drawing illustrating an A-A direction cross sectional view of the FIG. 1.
Figure 3:
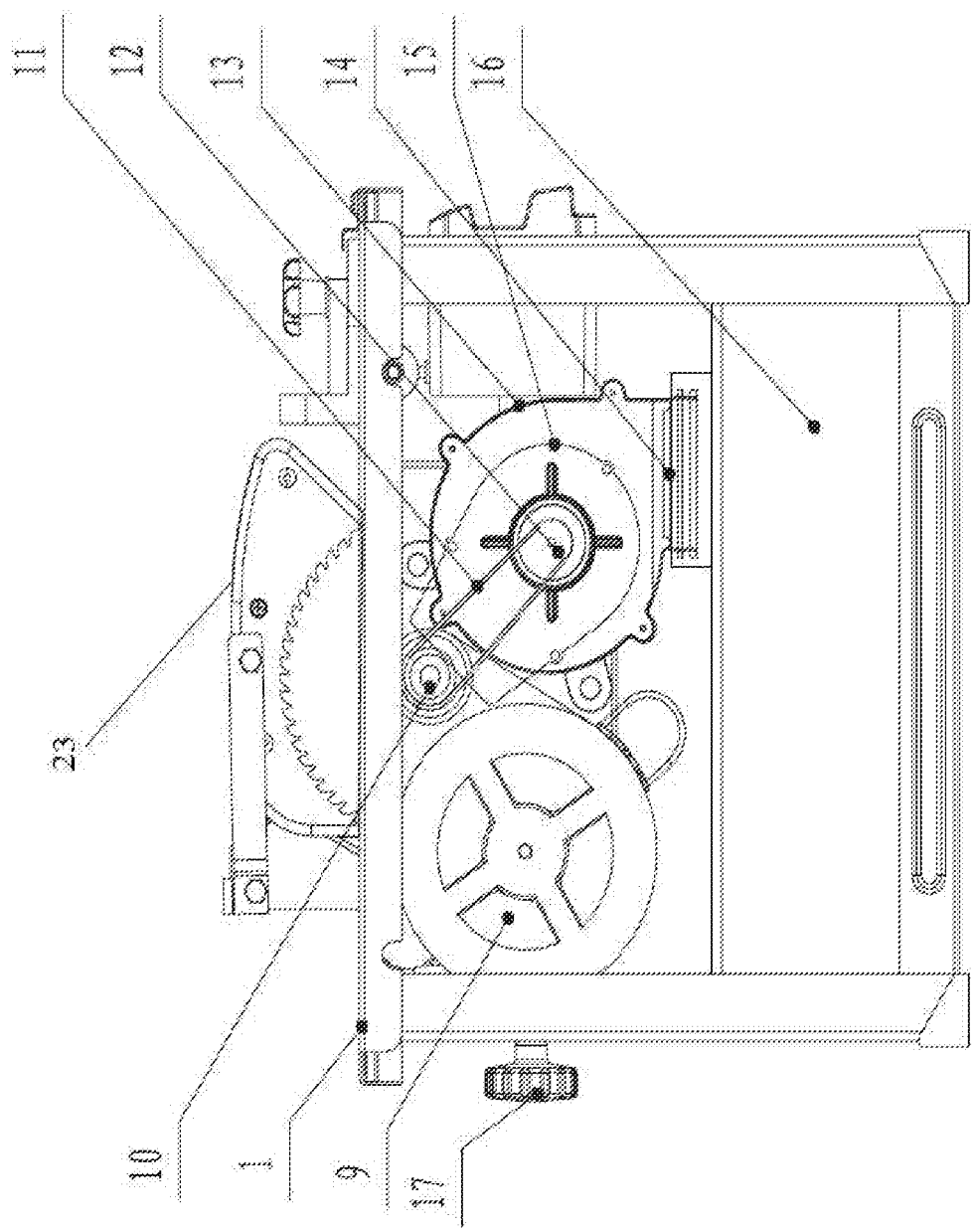
FIG. 3 is drawing illustrating a right view of the FIG. 1.

Embodiments:

As shown in FIGS. 1-3, a woodworking table saw with self vacuuming function comprises a worktable 1 and a saw blade 3. The worktable 1 is provided with a saw slot 2 through which the saw blade 3 is extended. A blade guard is disposed on the saw slot 2, and a riving knife 4 is disposed adjacent to a side of the saw blade 3. A riving knife holder 6 is provided for holding the riving knife 4. The woodworking table saw further has a closed box 7, an eccentric motor 9, a vacuuming air box 13 and a dust bag 16. The closed box 7 is hung beneath the worktable 1 by lugs 8 disposed under two sides of the worktable 1. The eccentric motor 9 is fixed at a side of the closed box 7. The eccentric motor 9 is provided with an eccentric shaft 10 which has one end coupling to the saw blade 3 and the other end coupling to a central shaft 12 of the vacuuming air box 13 via a belt 11. A fan blade is fixed on the central shaft 12. An air inlet 20 of the vacuuming air box 13 is in communication with a dust outlet 21 of the closed box and an air outlet 14 of the vacuuming air box 13 is in communication with the dust bag 16.

The vacuuming air box 13 is mounted at a side of the closed box 7. When the eccentric motor 9 is activated, the saw blade 3 and the fan blade in the vacuuming air box 13 are rotated simultaneously by the eccentric motor 9, so that the sawdust and the dust powder produced during the sawing process are automatically collected into the dust bag 16.

An upper portion of the closed box 7 is formed with a curved convex structure, and a lower portion of the saw slot which is connected with the closed box is formed with a curved concave structure corresponding to the curved convex structure. In this way, the closed box 7 and the saw slot 2 can be connected tightly while the closed box 7 is rotated, so that the sealing performance of the closed box 7 is ensured.

Further, a locking handle 17 is disposed at an outer end of the eccentric motor 9. The locking handle 17 is for securing the connection of the eccentric motor 9 and the vacuuming air box 13 in relation to a box body on which the eccentric motor 9 and the vacuuming air box 13 are located.

The two sides of the blade guard are attached to the worktable 1 in a way that the saw blade 3 is completely covered by the blade guard. In this way, a pollution caused by the leaked dust can be avoided.

An opening 19 is formed at a connecting portion between the riving knife holder 6 and the riving knife 4. A size and a thickness of the opening 19 corresponds to a lower portion of the riving knife 4, and a positioning device 5 is disposed adjacent to a side of the riving knife holder 6 so as to enable the riving knife 4 to be fixed. In this way, it is more convenient for a user to take/place the riving knife 4.

The air inlet of the vacuuming air box 13 is provided with a separating net 22 for preventing an invasion of wood chunk that may damage the fan blades of the vacuuming air box 13.

The air outlet 14 of the vacuuming air box is provided with a concave ring groove for connecting the air outlet 14 and the dust bag 16.

Figure 4:
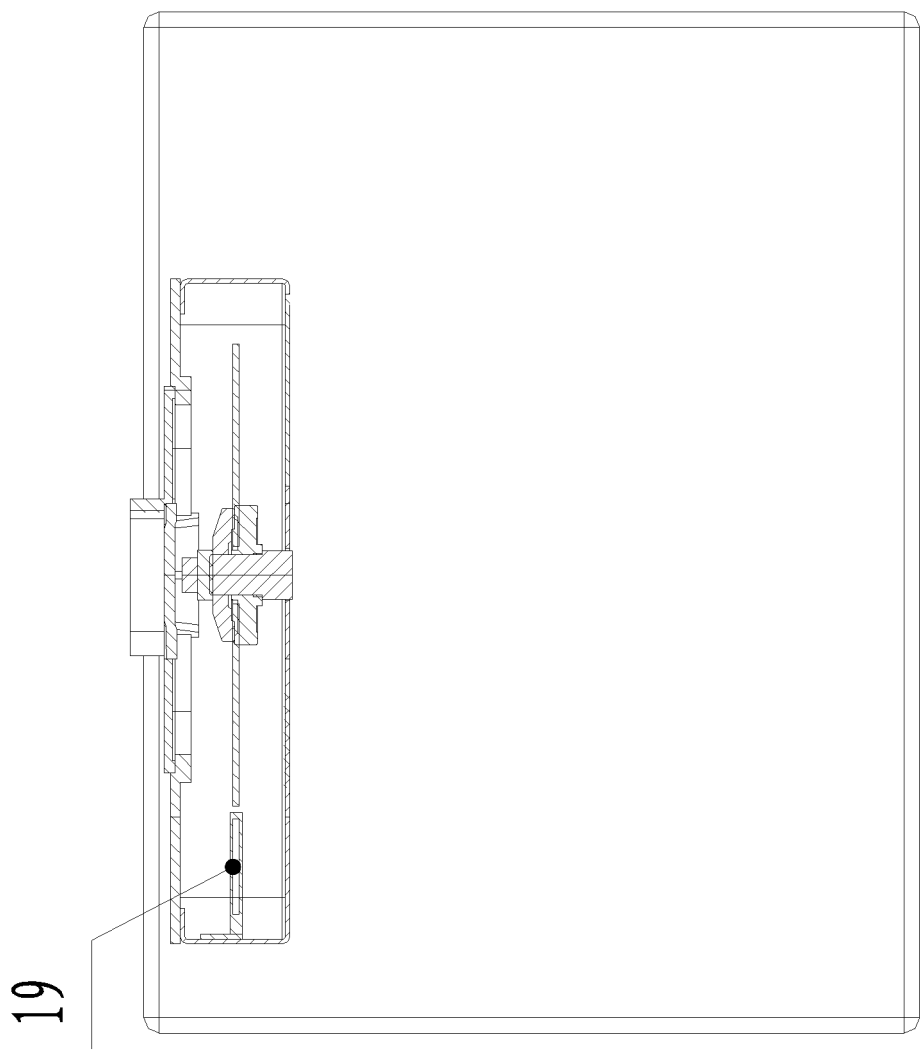
FIG. 4 is drawing illustrating a left view of the FIG. 1.
Figure 5:
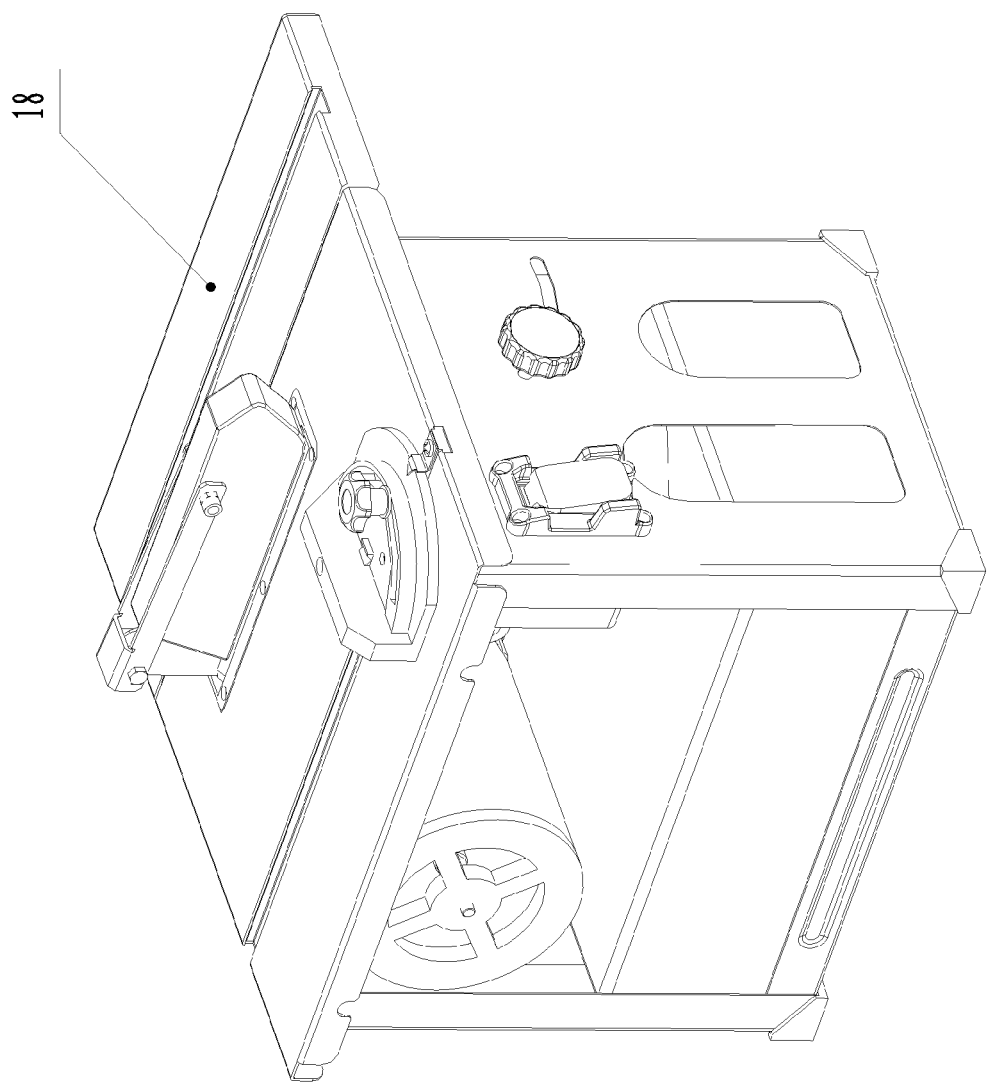
FIG. 5 is a structural schematic view of the woodworking table saw with self vacuuming function which is installed to a backside of an extension table in the present invention.

As shown in FIG. 4, the present invention further comprises an extension table 18 whose lower portion is with two rods by which the worktable 1 is inserted and is fixed by a bolt. The extension table 18 can be placed at the left or right side of the worktable 1 to increase the working area so that it is more convenient for a user to cut the timber. The extension table can be easily unmounted from the worktable 1.

A rotatable adjusting angle between the closed box 7 and the worktable is in a range from 0° to 45° for cutting the timber in a tilting angle.

It should be noted that, the above description is merely for explaining a preferred embodiment of the present invention, and is not intended to limit the present invention in any form. Therefore, any modification or alternation based on the spirit of the present invention should be included in the scope of the protection of the present invention.

What is claimed is:

1. A woodworking table saw with self vacuuming function, comprising:
   a worktable and a saw blade, the worktable being provided with a saw slot through which the saw blade is extended, a blade guard being disposed on the saw slot, a riving knife being disposed adjacent to a side of the saw blade, and a riving knife holder being provided for holding the riving knife, wherein the woodworking table saw further has a closed box, an eccentric motor, a vacuuming air box and a dust bag, the closed box is hung beneath the worktable by lugs disposed under two sides of the worktable, the eccentric motor is fixed at a side of the closed box, the eccentric motor having an eccentric shaft, which has one end coupled to the saw blade and the other end coupled to a central shaft of the vacuuming air box via a belt, a fan blade is fixed on the central shaft, an air inlet of the vacuuming air box is in communication with a dust outlet of the closed box and an air outlet of the vacuuming air box is in communication with the dust bag.

2. The woodworking table saw as claimed in claim 1, wherein two sides of the blade guard is attached to the worktable in a way that the saw blade is completely covered by the blade guard.

3. The woodworking table saw as claimed in claim 1, wherein an opening is formed at a connecting portion between the riving knife holder and the riving knife, a size and a thickness of the opening corresponds to a lower portion of the riving knife, and a positioning device is disposed adjacent to a side of the riving knife holder.

4. The woodworking table saw as claimed in claim 1, wherein the air inlet of the vacuuming air box is provided with a separating net for preventing an invasion of wood chunk.

5. The woodworking table saw as claimed in claim 1, wherein the air outlet of the vacuuming air box is provided with a concave ring groove for connecting the air outlet and the dust bag.

6. The woodworking table saw as claimed in claim 1, wherein a rotatable adjusting angle between the closed box and the worktable is in a range from 0° to 45°.

* * * * *